United States Patent [19]
Frater et al.

[11] Patent Number: 5,953,180
[45] Date of Patent: Sep. 14, 1999

[54] MULTI-MODE SUSPENSION POPULATED ACTUATOR FOR A DISK DRIVE

[75] Inventors: Norman Kermit Frater, Los Gatos; Peter William Kanas, San Jose, both of Calif.

[73] Assignee: International Business Machines Corporation, Armonk, N.Y.

[21] Appl. No.: 08/899,088

[22] Filed: Jul. 23, 1997

[51] Int. Cl.⁶ .............................. G11B 33/14; G11B 5/48
[52] U.S. Cl. ........................................ 360/97.02; 360/104
[58] Field of Search .............................. 360/97.01, 97.02, 360/97.03, 103, 104, 106

[56] References Cited

U.S. PATENT DOCUMENTS

| | | | |
|---|---|---|---|
| 4,734,805 | 3/1988 | Yamada et al. | 360/104 |
| 4,760,478 | 7/1988 | Pal et al. | 360/104 |
| 4,835,641 | 5/1989 | Maeda | 360/104 |
| 5,319,512 | 6/1994 | Grapenthin | 360/106 |
| 5,381,289 | 1/1995 | Fiedler | 360/104 |

FOREIGN PATENT DOCUMENTS

| | | |
|---|---|---|
| 63-144471 | 6/1988 | Japan . |
| 63-144472 | 6/1988 | Japan . |
| 63-144473 | 6/1988 | Japan . |
| 63-144474 | 6/1988 | Japan . |
| 1-189084 | 7/1989 | Japan . |
| 3-278382 | 12/1991 | Japan . |
| 4-216376 | 8/1992 | Japan . |

OTHER PUBLICATIONS

"Piezoelectric Modal Sensor/Actuator Devices for DASD Active Damping Vibration Control," *IBM Technical Disclosure Bulletin*, vol. 34, No. 4B, pp. 53–54, Sep. 1991.

"Suspension Assembly with Torsion–Proof Stiffeners," *IBM Technical Disclosure Bulletin*, vol. 36, No. 4, p. 71, Apr. 1993.

"Suspension Assembly with Geometrical Non–Linearity Damping Effect," *IBM Technical Disclosure Bulletin*, vol. 38, No. 2, pp. 551–554, Feb. 1995.

*Primary Examiner*—A. J. Heinz
*Attorney, Agent, or Firm*—Noreen A. Krall

[57] ABSTRACT

The invention is several alternative means of differentiating head/gimbal assemblies that share a common arm. The alternative means are for at least one of the assemblies that shares a common arm (1) using a different design; (2) varying the length from the mounting section to the slider; (3) changing the shape of the spring section; (4) varying the use and shape of raised flanges; (5) varying the use and shape of stiffeners; (6) using different openings (i.e., cut away portions); (7) using different formed features; (8) using various mass appendages; and (9) using a varying pattern of adhesive or glue dots.

3 Claims, 14 Drawing Sheets

MULTI-MODE SUSPENSION POPULATED ACTUATOR FOR A DISK DRIVE

FIELD OF THE INVENTION

The present invention relates to the field of disk drives, also known as direct access storage devices (DASD). More particularly, the invention pertains to numerous alternative means for reducing or eliminating detrimental mechanical "cross-talk" between multiple head/gimbal assemblies on a disk drive.

BACKGROUND OF THE INVENTION

One of the key requirements of a computer system is a place to store data. Typically computer systems employ a number of storage means to store data. One of the places where a computer can store data is in a disk drive which is also called a direct access storage device (DASD).

A disk drive or DASD includes several disks which look similar to records used on a record play or compact disks which are used in a CD player. The disks are stacked on a spindle, much like several 45 rpm records awaiting to be played. In a disk drive, however, the disks are mounted to the spindle and spaced apart so that the separate disks do not touch each other.

The surface of each disk is uniform in appearance. However, in actuality, the surface of each disk is divided into portions where data is stored. There are a number of tracks of the disk situated in concentric circles like rings on a tree. Compact disks have tracks, as do the disks in a disk drive. The tracks in either the disk drive or the compact disk essentially replace the grooves on a conventional record. Each track in a disk drive is further subdivided into a number of sectors which is essentially just one section of the circumferential track.

Disks used in a disk drive are made of a variety of materials. Most commonly, the disk is made of metal, glass or plastic. The materials from which the disk is made determines how data is stored on the disk. A plastic disk, such as those used as CDS, stores data using lasers and a laser is used to read the data back. Storage of data on a metal or glass disk entails magnetizing portions of the disk surface coating in a pattern which reflects the data.

To store data on a metal or glass disk, the disk surface coating is magnetized. In order to magnetize the surface of a disk, a small ceramic block which contains a magnetic transducer known as a "write head" (also called "write transducer") is passed over the surface of the disk. More specifically, the write head is flown at a height of approximately six millionths of an inch from the surface of the disk and is flown over the track as the write head is energized to various states causing the track below to be magnetized to represent the data to be stored.

To retrieve data stored on a magnetic disk, a ceramic block which contains a "read head" (also called a "read sensor") is flown over the metal disk. The magnetized portions of the disk induce a current in the read head. By looking at output from the read head, the data can be reconstructed for use by the computer system.

Typically, the same ceramic block contains both a read head and a write head.

Like a record, both sides of a disk are generally used to store data or other information necessary for the operation of the disk drive. Since the disks are held in a stack and are spaced apart from one another, both the top and the bottom surface of each disk in the stack of disks has a ceramic block, also known as a slider, associated with each surface. This would be comparable to having a stereo that could play both sides of a record at once. In the record analogy, each side would have a stylus which played the particular side of the record.

Disk drives also have something, called an actuator, that compares to the tone arm of a stereo record player. There are two types of actuators, rotary and linear. Rotary disk drives have a tone arm that rotates much like a record player. The tone arm of a rotary disk drive, termed a suspension assembly or a head/arm assembly, typically has one slider attached at one end. The other end of a head/arm assembly is attached to a comb-like structure. There is one head/arm assembly associated with each surface of each disk. Alternatively, two head/arm assemblies may be attached to a single arm, with the end of the arm bifurcated to accommodate a head/arm assembly for the top of the disk and a second head/arm assembly for the adjacent disk. The comb-like structure facilitates holding each head/arm assembly. The entire comb-like structure with multiple head/arm assemblies attached, is termed a head/stack assembly.

Like a tone arm, the head/arm assembly rotates so that the read and write heads in the slider which is attached to the head/arm assembly can be moved to locations over various tracks on the disk. In this way, the write heads can be used to magnetize the surface of the disk in a pattern representing the data at one of the several track locations or the read heads can be used to detect the magnetized pattern on one of the tracks of a disk. For example, the needed data may be stored on two different tracks on one particular disk, so to read the magnetic representations of data, the head/arm assembly is rotated from one track to another track. A linear disk drive, has a suspension assembly similar to that of a rotary disk drive. However, in a linear disk drive, instead of repositioning by rotation, repositioning is accomplished through linear movement.

Both the read head and the write head attached to the slider require a pair of wires to be attached to the slider itself. Thus, a typical head/arm assembly has a total of four wires. These wires are very fine and are about 0.0014 inches thick, which is about half the thickness of a human hair. The wires carry electrical signals. The electrical signals attached to the write head are used to store representations of data on one of the disk surfaces of the disk drive. The electrical signals attached to the read head are used to carry signals representing the data back from one of the surfaces of the disk which has data stored on it. A set of wires for each read head and write head are strung along each of the actuator arms in the disk drives. Each set of wires for each of the read heads and write heads typically is attached to a flexible cable which allows the suspension assembly to move while maintaining electrical connection with each of the heads on the slider. Other heads are constructed such that five wires are necessary. Still other heads are constructed with a common head which performs both read and write functions. This type of head only requires a single pair of wires to be attached to the slider.

High data capacity disk drives have very small disk to disk spacings. This leaves less room to package arms and suspension assemblies. The arm tips become very thin, more flexible and subject to undesired vibration excursions from the load beams attached to the arm tips. When two head/gimbal assemblies attached to a single arm are excited into vibration, such as from actuation input forces, from air turbulence, or from disk vibration or contact inputs, the head/gimbal assemblies in turn excite the arm tip that holds the slider and also excite each other. For example, in today's high capacity disk drives, the arm tips may be reduced in thickness to only 0.57 mm thick and made of aluminum. These small arm tips support two head/gimbal assemblies, each weighing approximately 0.12 grams. Detrimental cross talk has been observed during accessing and during track following in which the resonant frequency of one head/gimbal assembly is seen as a response on another head/gimbal assembly. This phenomenon often appears to be mode splitting, however, it actually is due to mechanical coupling of the two head/gimbal assemblies. The resulting amplitude of each head/gimbal assembly's vibration is larger because the response of one head/gimbal assembly's mode is riding up the gain slope of the other head/gimbal assembly. This phenomenon has been observed on first bending, first torsion, second bending and second torsion modes at 1300 hz, 2000 hz, 4200 hz and 5500 hz in a particular head/gimbal assembly.

SUMMARY OF THE INVENTION

It is an object of the invention to provide a means for minimizing the detrimental cross-talk between head/gimbal assemblies.

It is a further object of the invention to provide a means for minimizing the detrimental cross-talk between head/gimbal assemblies in a cost effective manner that can be incorporated into existing production lines.

The invention is several alternative means of differentiating head/gimbal assemblies that share a common arm. The alternative means are for at least one of the assemblies that shares a common arm (1) using a different design; (2) varying the length from the mounting section to the slider; (3) changing the shape of the spring section; (4) varying the use and shape of raised flanges; (5) varying the use and shape of stiffeners; (6) using different openings (i.e., cut away portions); (7) using different formed features; (8) using various mass appendages; and (9) using a varying pattern of adhesive or glue dots.

It is an advantage of the invention that several alternative means are provided for minimizing the detrimental mechanical cross-talk between head/gimbal assemblies sharing a common arm. Each alternative is cost-effective and can be incorporated into existing production lines.

DETAILED DESCRIPTION OF THE INVENTION

The invention relates to an article of manufacture known as a suspension assembly used in a disk drive and, in particular, to means for reducing or eliminating undesired mechanical "cross-talk" among multiple attached or neighboring load beams on a head/arm assembly. The invention can best be understood by reference to the drawings.

Figure 1:
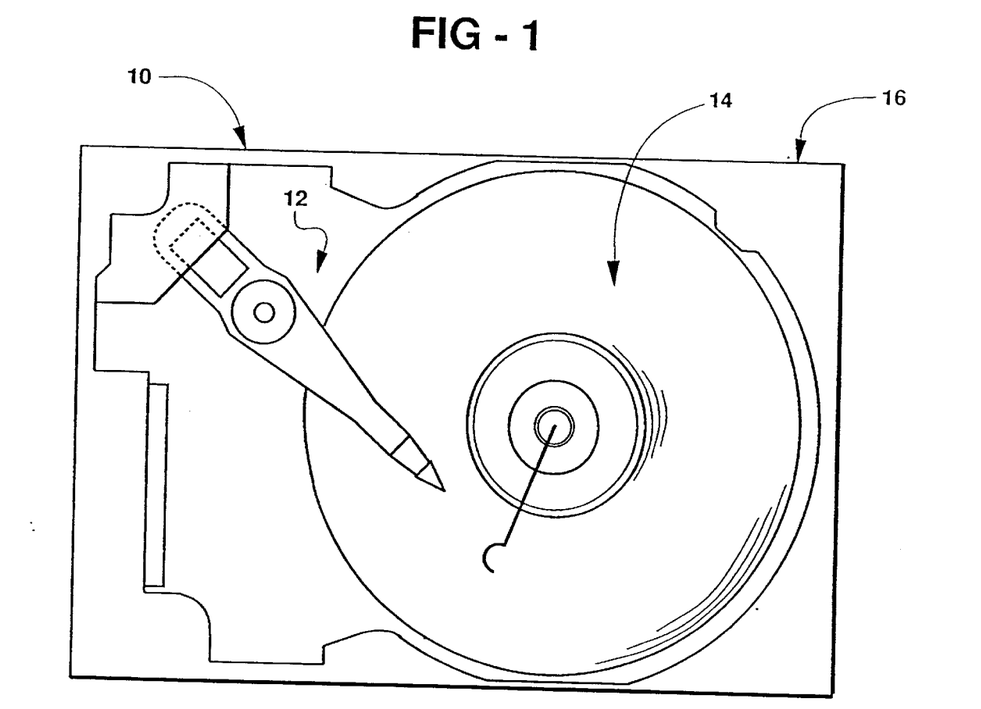
FIG. 1 is a top view diagram of a disk drive, showing a head/stack assembly.

FIG. 1 is a top view of a disk drive 10 showing a head/stack assembly 12. Also shown is a sample disk 14 on which information is stored that needs to be accessed by an information handling system (i.e., computer, not shown). Also shown is the casing 16 surrounding and protecting the disk 14 and the head/stack assembly 12. Although a rotary head/stack assembly 12 is shown, the invention applies to linear head/stack assembly drives as well.

Figure 2:
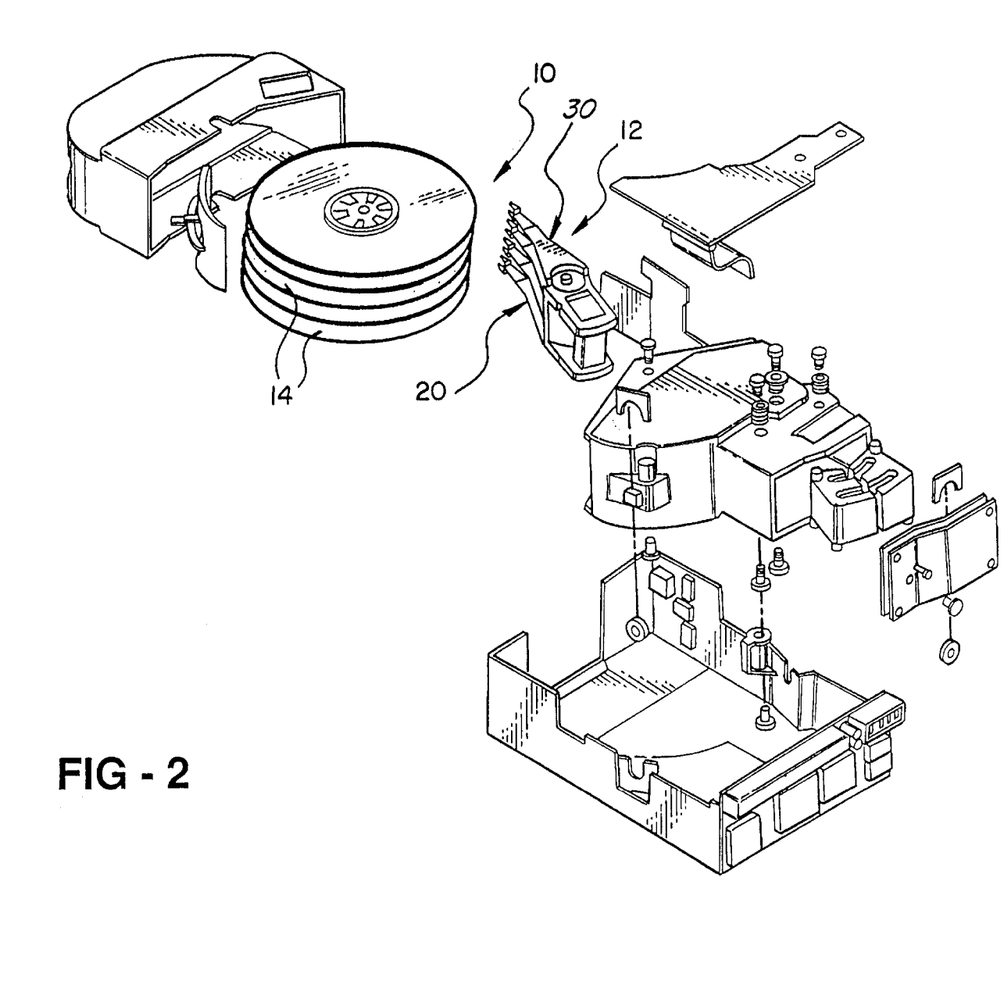
FIG. 2 is an exploded view of a head/stack assembly.

FIG. 2 shows an exploded view of disk drive 10 and head/stack assembly 12 used to access information on disks 14. Head/stack assembly 12 has multiple head/arm assemblies each with two head/gimbal assemblies one of which is labeled 30. FIG. 2 shows as an example four head/arm assemblies. However, head/stack assembly 12 could comprise one or more head/arm assemblies. Moreover, while FIG. 2 shows two head/gimbal assemblies per head/arm assembly, each head/arm assembly could have only one head/gimbal assembly, or could have more than two head/gimbal assemblies.

Figure 3:
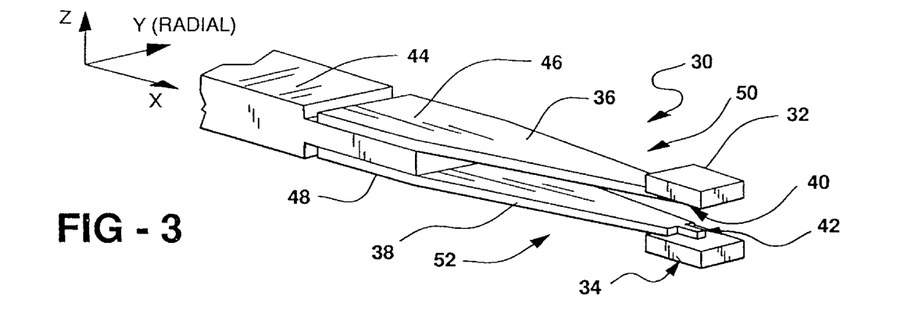
FIG. 3 is a isometric view diagram of a single arm of a head/stack assembly.

FIG. 3 is a isometric view diagram of a single head/arm assembly 30 of head/stack assembly 12. FIG. 3 shows the overall design of head/arm assembly 30. The head/arm assembly 30 consists of two sliders 32 and 34 each of which is bonded to a load beam labeled 36 and 38, respectively. The load beams 36 and 38 provide each slider 32 and 34 with appropriate pitch and roll stiffness which is important in accurately reading and writing information to and from a disk 14. As discussed in the background section, the sliders 32 and 34 are used to read or write information from or to the disk 14 in a disk drive 10. A gimbal 40 and 42, respectively, attaches each slider 32 and 34 to its respective load beam 36 and 38. Each load beam 36 and 38 is attached to an arm 44. The area in which the attachment occurs is called a mounting section 46 and 48. The spring section 62 (shown in FIG. 4) provides the appropriate vertical load for optimal operation of the head/arm assembly 30. The combination of the load beam 36, the gimbal 40, and the slider 32 forms a top head/gimbal assembly 50. Similarly load beam 38, gimbal 42 and slider 34 form a bottom head/gimbal assembly 52. FIG. 3 shows a particular embodiment of a head/arm assembly 30. Other embodiments are possible. The head/arm assembly comprises generally a slider attached to an arm by means of a flexing member (described as a load beam in FIG. 3).

Figure 4:
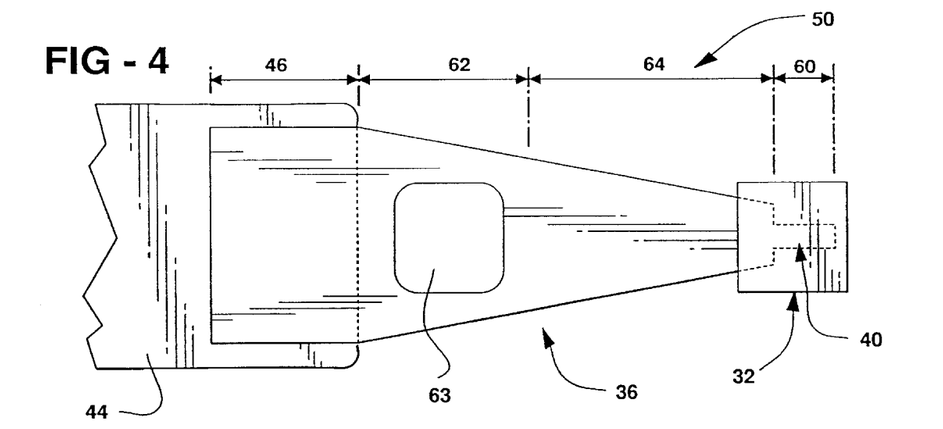
FIG. 4 is an expanded top view diagram of the top head/gimbal assembly shown in FIG. 3.

FIG. 4 is an expanded view of top head/gimbal assembly 50 shown in FIG. 3. FIG. 4 shows the slider 32 attached to the load beam 36 by means of gimbal 40. The function of the gimbal 40 is to allow the slider 32 to rotate freely in the pitch and roll axes as it moves across the disk 14. The slider 32 and the gimbal 40 form a gimbal section 60. The load beam 36 has a spring section 62 encompassing cutout opening 63, which generates a load and allows the slider 32 to move normal to the surface of disk 14. Load beam 36 also has a beam section 64 which transmits the load to the slider 32. The mounting section 46 attaches the head/gimbal assembly 50 to the arm 44.

Figure 5:
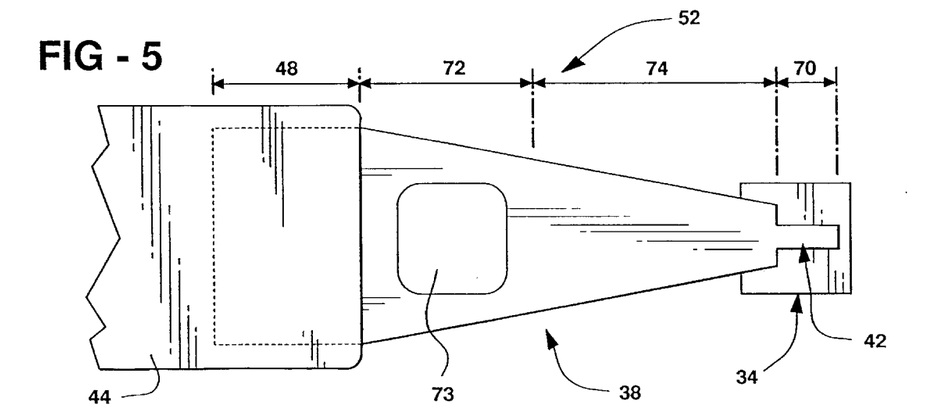
FIG. 5 is an expanded top view diagram of the bottom head/gimbal assembly shown in FIG. 3.

FIG. 5 shows a top view of bottom head/gimbal assembly 52 shown in FIG. 3. FIG. 5 shows the slider 34 attached to the load beam 38 by means of gimbal 42. The slider 34 and the gimbal 42 form a gimbal section 70. The load beam 38 has a spring section 72 encompassing cutout opening 73 and a beam section 74. Mounting section 48 attaches the head/gimbal assembly 52 to the arm 44.

Each head/gimbal assembly 50 and 52 responds to a plurality of structural modes of vibration, such as its first bending, first torsion, second bending, second torsion, and sway modes. To keep manufacturing costs low, common part numbers are used whenever possible. This means that the same head/gimbal assembly is used for head/gimbal assembly 50 and 52. Where wire pairs or trace lead structures are employed to connect the assembly electronics (not shown) of the sliders 32 and 34, the routing of these electrical leads is commonly reversed for the top and bottom heads, such that the finished top and bottom head/gimbal assemblies 50 and 52 attached to an arm 44 are mirror images of each other.

Figure 6:
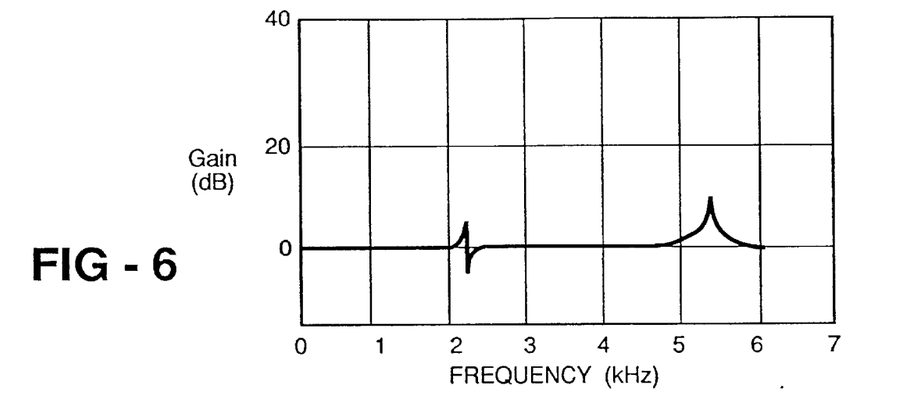
FIG. 6 is a graph of a radial frequency response of a single head/gimbal assembly.
Figure 7:
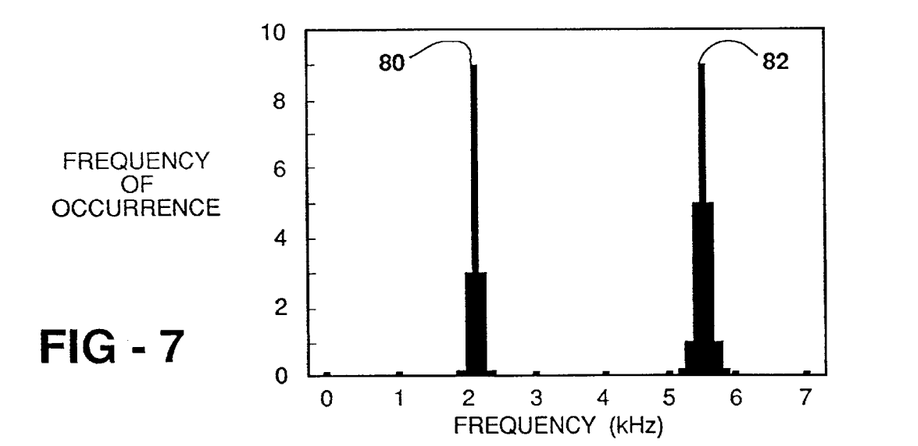
FIG. 7 is a graph of a probability distribution of the frequency range of a single head/gimbal assembly.
Figure 8:
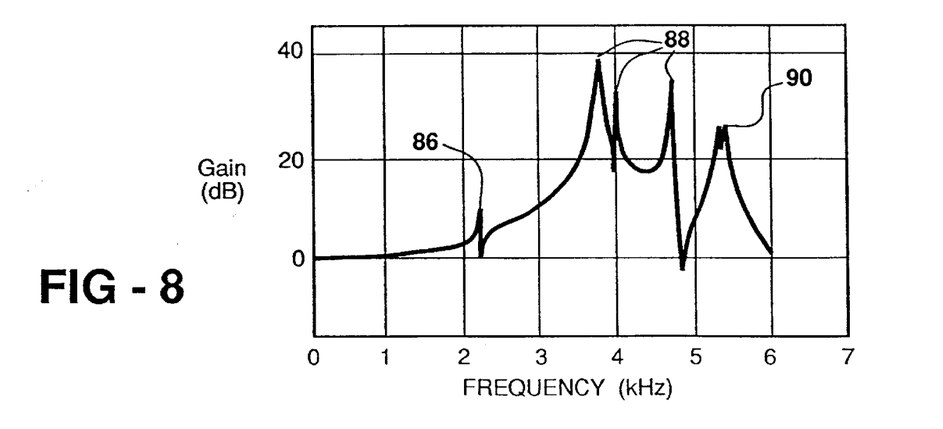
FIG. 8 is a graph of a frequency response of a head/arm assembly with a top head/gimbal assembly and a bottom head/gimbal assembly that are ostensibly the same.

Yet the structural mass and stiffness of each of the two head/gimbal assemblies 50 and 52 are identical within manufacturing tolerances and their structural modes of vibration are identical within resulting frequency and damping tolerances. FIG. 6 shows a typical radial frequency response of a single head/gimbal assembly such as those shown as 50 and 52. FIG. 7 shows the probability distribution of the frequency range of the first and second torsion resonance 80 and 82 of either a top head/gimbal assembly such as 50 or a bottom head/gimbal assembly such as 52. There is a substantial probability that any of the bending, torsion and sway modes of top and bottom head/gimbal assemblies on a given arm will match each other. In these cases, the resonances affecting the positioning of each of the read/write sliders 32 and 34 will be larger in amplitude and also can show additional resonances. The increase in amplitude is detrimental to the positioning accuracy of the sliders 32 and 34 in the disk drive 10. FIG. 8 shows the frequency response of one of the head/gimbal assembly of a head/arm assembly in which the top and bottom torsion resonance 80 match closely in resonant frequencies. First mode 86 shows a single peak with a higher amplitude due to both suspensions matching in resonant frequency. Modes 88 are additional modes due to actuator and arm resonances. Second mode 90 is split into two peaks and higher in amplitude than with a single suspension assembly due to closely matched second modes of the top and bottom suspensions (see FIG. 6). This phenomenon results in the degradation of positioning accuracy of each suspension assembly and is particularly pronounced due to the higher amplitude for two head/gimbal assemblies attached to one head/arm assembly.

The solution to the degradation of positioning accuracy of both read/write sliders 32 and 34 is to purposefully detune one of the head/gimbal assemblies 50 or 52 dynamically from the other. This can be achieved by making the top and bottom head/gimbal assemblies 50 and 52 different from each other in mass and/or in stiffness so that the resonant frequencies of the top head/gimbal assembly 50 are different from the resonant frequencies of the bottom head/gimbal assembly 52. FIG. 9 shows the distribution of resonant frequencies of top and bottom head/gimbal assemblies on an arm in which the bottom head/gimbal assembly has been altered by lowering its stiffnesses.

Figure 9A:
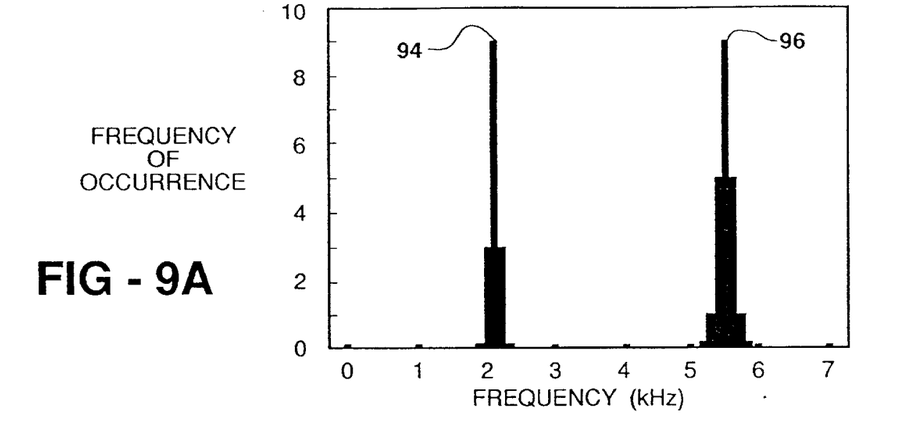
FIG. 9 is a graph comparing the frequency of a top head/gimbal assembly (FIG. 9A) and a bottom head/gimbal assembly (FIG. 9B) that has a lower stiffness than the top assembly.

FIG. 9A shows the frequency range modes for a top head/gimbal assembly. The frequency range for the first mode of the top head/gimbal assembly is labeled 94. The frequency range for the second mode of the top head/gimbal assembly is labeled 96.

Figure 9B:
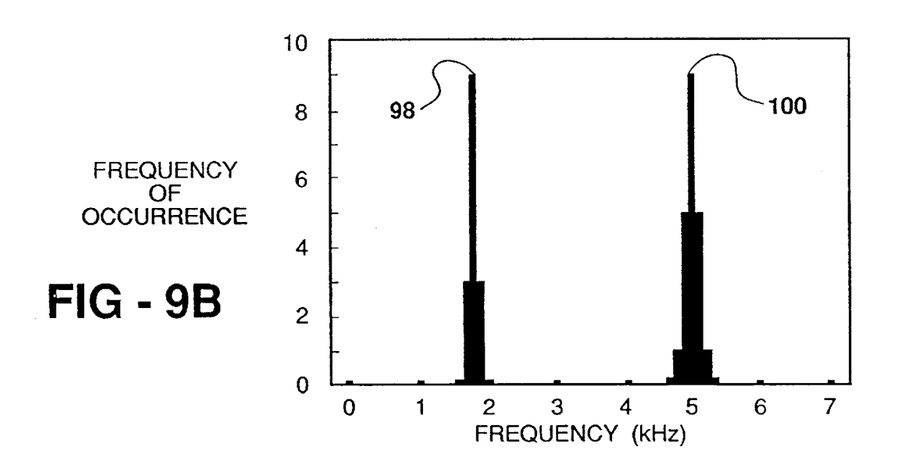

FIG. 9B shows the frequency range modes for a bottom head/gimbal assembly. The frequency range for the first mode of the bottom head/gimbal assembly is labeled 98. The frequency range for the second mode of the bottom head/gimbal assembly is labeled 100. Notice that the distribution of the resonances of the bottom head/gimbal assembly shown in FIG. 9B is shifted downward in frequency compared to the distribution of resonances on the top assembly shown in FIG. 9A. There is now a very small probability that any of the bending, torsion and sway modes of the two head/gimbal assemblies will match each other and therefore no detrimental increase in amplitude will be caused by matching of resonances.

Figure 10:
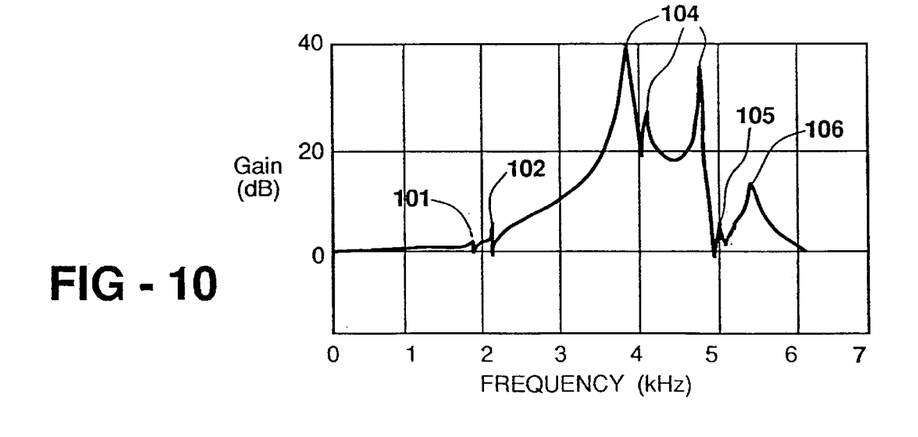
FIG. 10 is a graph of the frequency response of a head/arm assembly in which the top and bottom head/gimbal assemblies have different resonant frequencies.

FIG. 10 shows the frequency response of the top head of a head/arm assembly in which the top and bottom head/gimbal assemblies are purposely made to have different resonant frequencies. The frequency response of the first mode is labeled 102. The frequency response of the actuator and arm modes is labeled 104 and the frequency response of the second mode is labeled 106. Note that the effect of the bottom head/gimbal assembly in the frequency response of the top head/gimbal assembly is now negligible. The first mode 101 and second mode 105 of the bottom head/gimbal assembly do not influence the amplitudes of the first mode 102 and the second mode 106 of the top head/gimbal assembly.

Whereas the preceding discussion applied to the radial frequency response of the top and bottom head/gimbal assemblies on an actuator arm, the same detrimental effects can be seen in other frequency response functions. For example the normal actuator assembly frequency response function at the slider is affected by the bending modes of the head/gimbal assemblies. The normal response is along the z-axis (defined in FIG. 3) which affects the spacing between the slider and the disk. The bending modes of the top and bottom suspension assemblies can be excited by disk runout and flutter, by air flow across the suspensions and by actuator seek, settle and track following inputs.

When the bending modes (primarily the first and second bending modes) of the top suspension assembly and the bottom suspension assembly attached to a given actuator arm are closely matched in frequency, the excitation of one of the suspensions can couple to produce motion of the other suspension on the arm. When this happens, the amplitude of both suspensions is higher than it would be for only one suspension attached to the actuator arm. Thus the spacing modulation of each of the sliders is greater, causing detrimental magnetic performance and increased probability of head to disk contacts.

When the suspensions are excited sympathetically so that the normal motion of the sliders is excessive, magnetic performance of the read/write heads is degraded (especially by high spacings) and the probability of head to disk contact increases (especially by low spacings). Thus if normal motion of the sliders increases due to resonances, both magnetic performance and reliability of the sliders is degraded since resonance produces excursions in both directions from a nominal spacing.

When the two head/gimbal assemblies are made different in mass and/or stiffness so that their bending mode frequencies do not match, then each of their amplitudes of normal motion of the slider returns to the lower response expected for only one suspension mounted to one arm.

The solution to the cross-talk problem between a top and bottom head/gimbal assembly thus is to make the two head/gimbal assemblies on a given head/arm assembly dynamically different from each other. The difference may be in the amount and distribution of mass and/or stiffness, or both. The following illustrations show ways of achieving different mass and stiffness between a top and bottom head/gimbal assembly. Features that are the same as in FIGS. 4 and 5 have been assigned the same numbers shown in those figures.

Figure 11A:
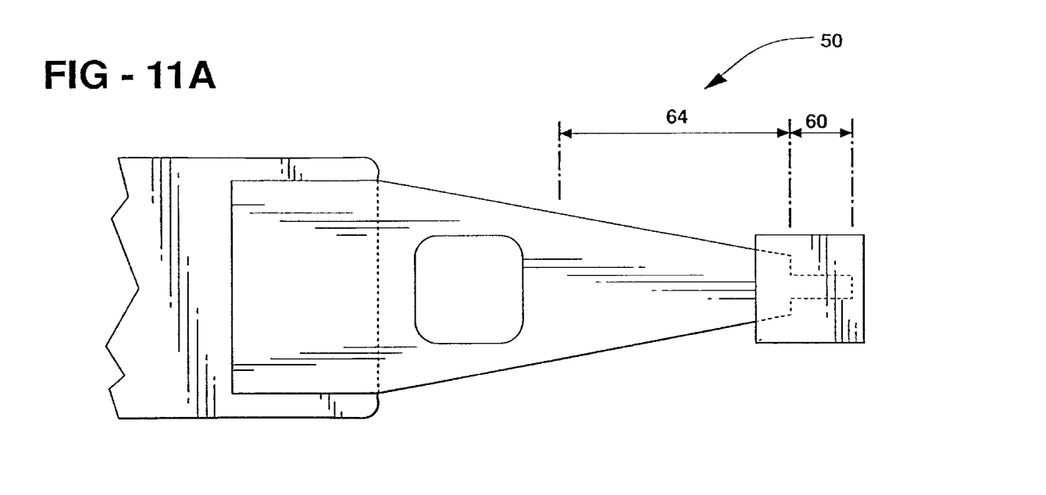
FIG. 11 is a top view of a top head/gimbal assembly (FIG. 11A) with a different design from a bottom head/gimbal assembly (FIG. 11B).
Figure 11B:
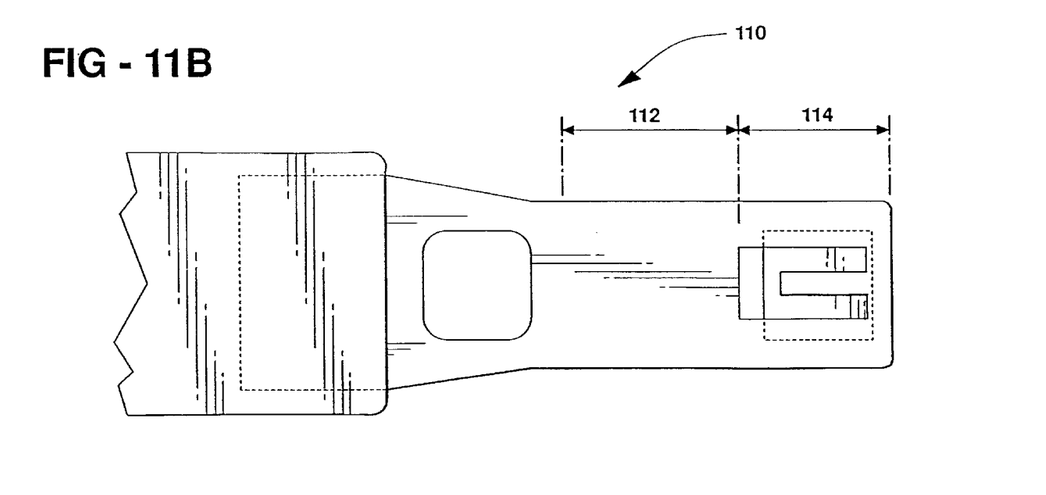

FIG. 11 shows top head/gimbal assembly 50 and a bottom head/gimbal assembly 110 that differ from each other in design. Top head/gimbal assembly 50, shown in FIG. 11A has the same design as top head/gimbal assembly 50 shown in FIG. 4. FIG. 11B shows bottom head/gimbal assembly 110. Bottom head/gimbal assembly 110, however, has a different design from top head/gimbal assembly 50 and from the bottom head/gimbal assembly 52 shown in FIG. 5. Bottom head/gimbal assembly 110 has a wider beam section 112 and a different gimbal section 114 as compared to beam section 64 and gimbal section 60 of top head/gimbal assembly 50. The modifications in design shown in FIG. 11B are as an example. The modification may be achieved in one or more ways such as difference in material, material thickness, outline of the part, construction details, and size of features such as structural members, flanges, holes, tabs and so forth.

Figure 12A:
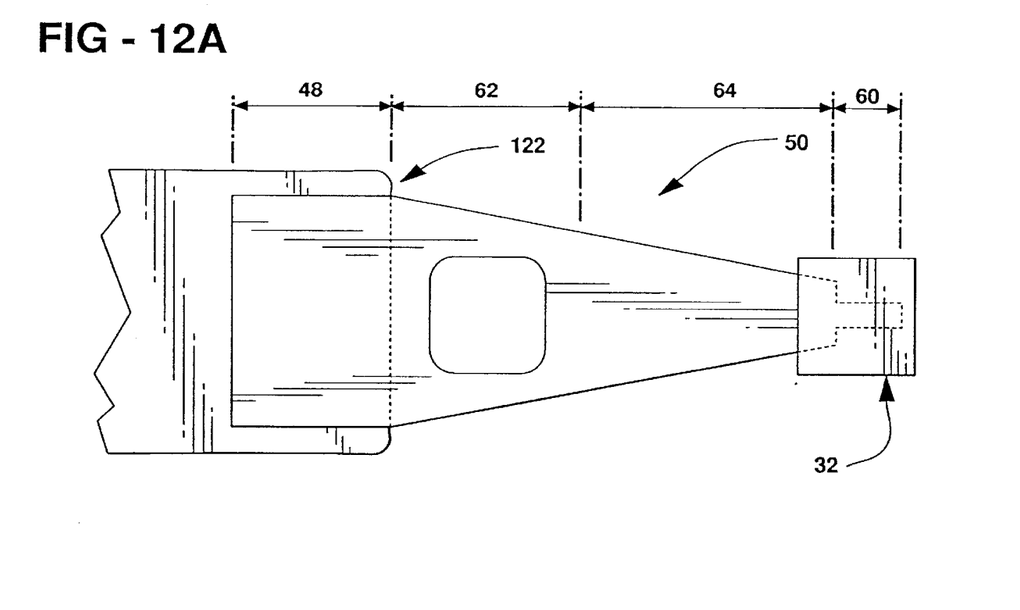
FIG. 12 is a top view of a top head/gimbal assembly (FIG. 12A) with a different length from a mounting section to a slider compared to a bottom head/gimbal assembly (FIG. 12B).
Figure 12B:
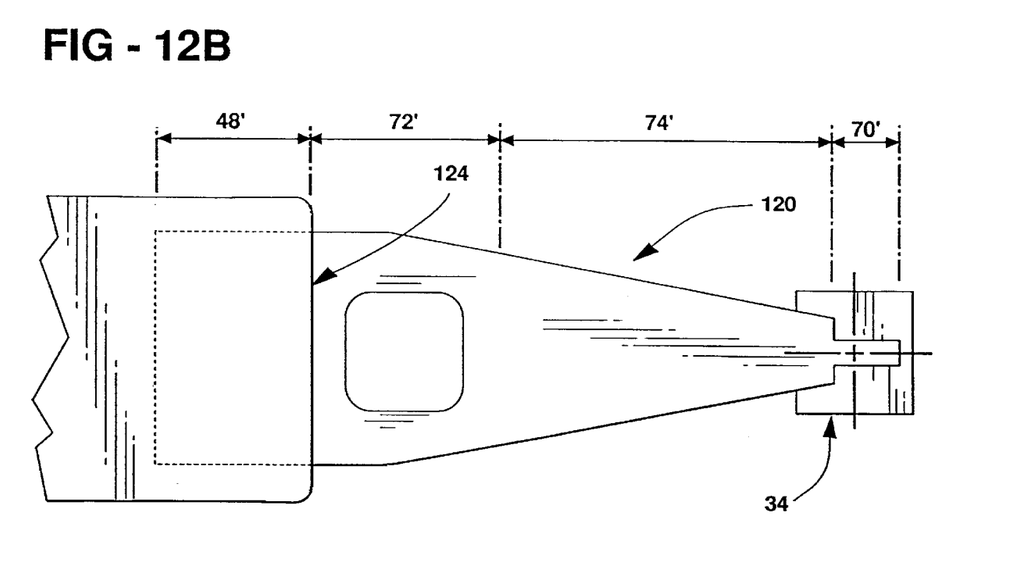

FIG. 12 shows that the top head/gimbal assembly 50 (shown in FIG. 12A) and bottom head/gimbal assembly 120 (shown in FIG. 12B) are different in the functional length from the boundary between the mounting and spring sections 122 and 124 to the centerline of the read/write sliders 32 and 34. FIG. 12 shows one embodiment of such a difference in functional length. Other variations in the length or shape of the functional length are possible and are within the scope of the invention.

Figure 13A:
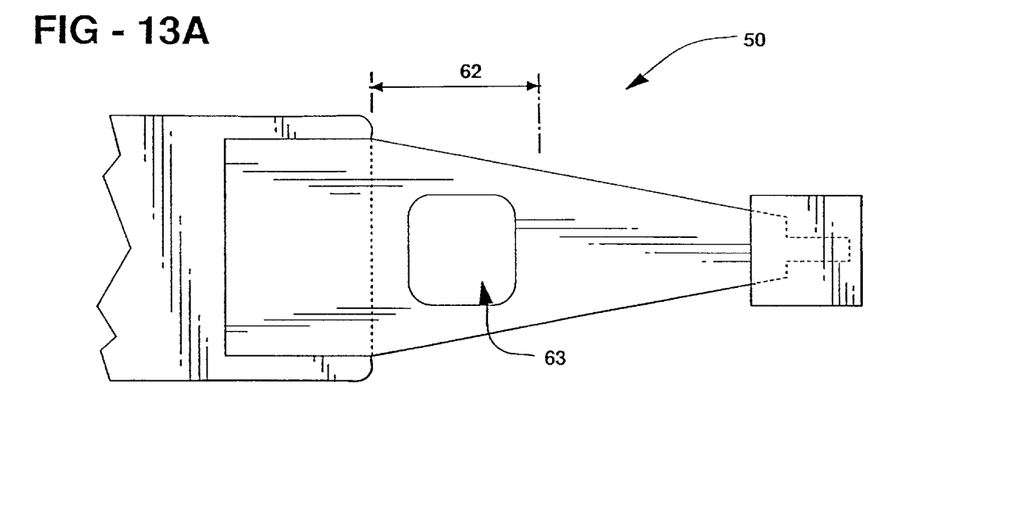
FIG. 13 is a top view of a top head/gimbal assembly (FIG. 13A) with a different spring section from a bottom head/gimbal assembly (FIG. 13B).
Figure 13B:
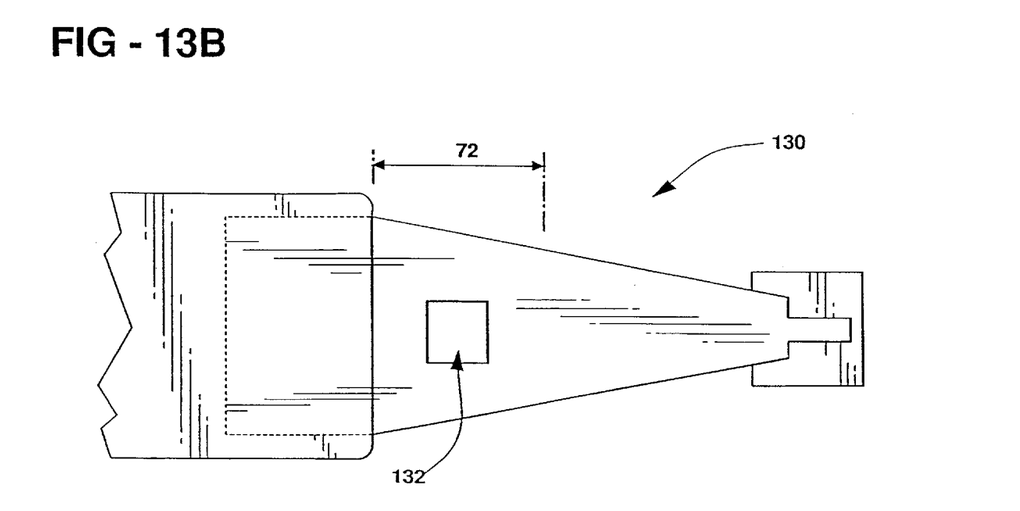

FIG. 13 shows that the top head/gimbal assembly 50 (shown in FIG. 13A) and bottom head/gimbal assembly 130 (shown in FIG. 13B) are different in the width and length of the respective cutout openings 63 and 132 of spring section 62 and 72 (shown in FIGS. 4 and 5). Other variations in the spring sections are possible and are within the scope of the invention.

Figure 14A:
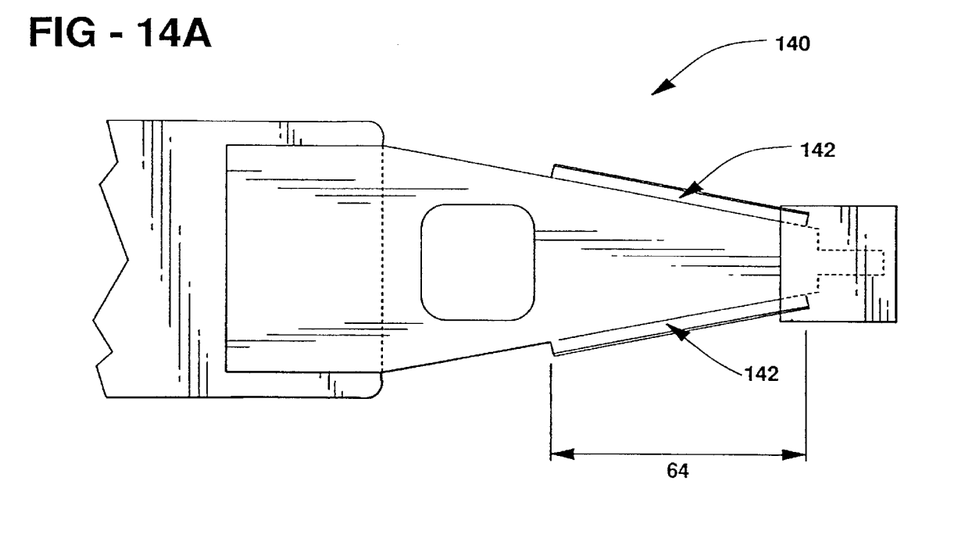
FIG. 14 is a top view of a top head/gimbal assembly (FIG. 14A) with different raised flanges from a bottom head/gimbal assembly (FIG. 14B).
Figure 14B:
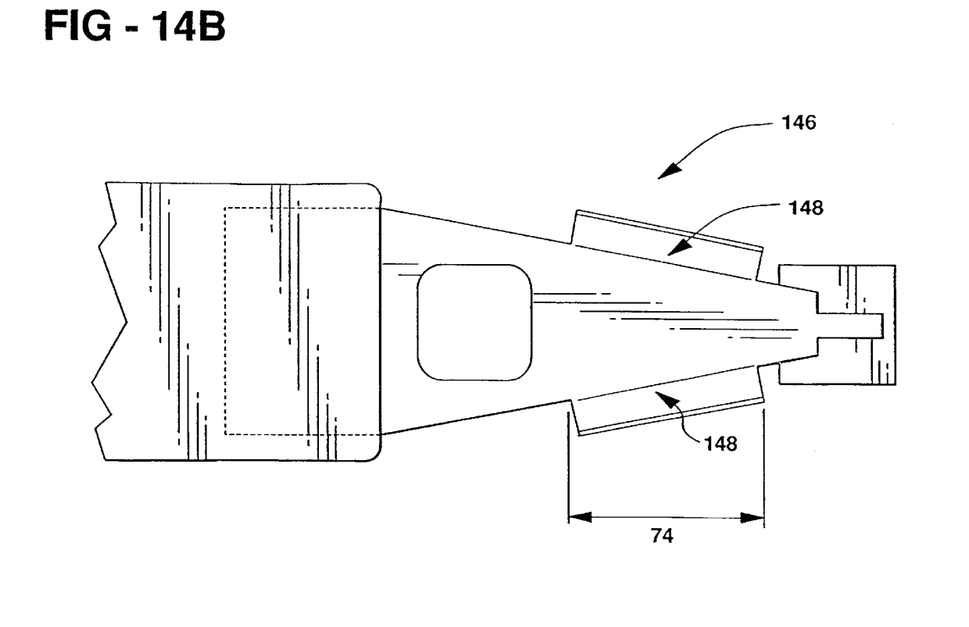

FIG. 14A shows top head/gimbal assembly 140. Top head/gimbal assembly 140 has raised flanges 142 on either side of beam section 64. FIG. 14B shows bottom head/gimbal assembly 146 with flanges 148 down beam section 74 that differ in width and/or length and/or position and/or resulting formed height from flanges 142. FIGS. 14 shows only one embodiment of the invention. Other variations in the shape of the raised flanges and in the presence or absence of raised flanges are possible and are within the scope of the invention.

Figure 15A:
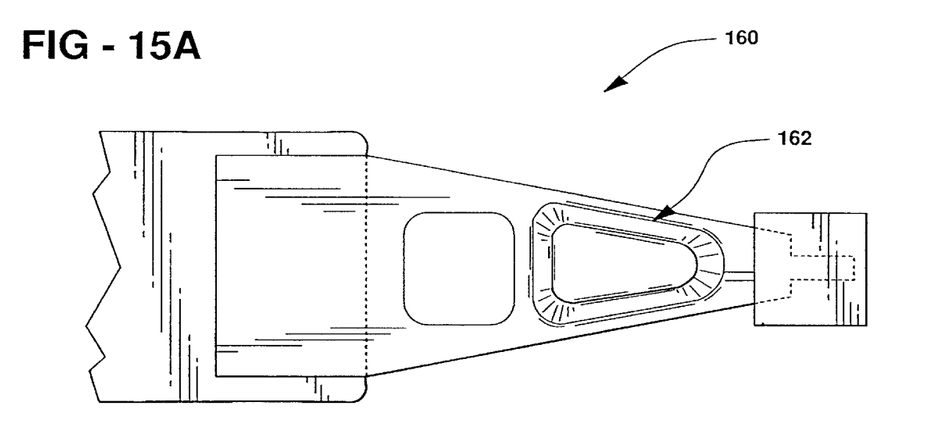
FIG. 15 is a top view of a head/gimbal assembly (FIG. 15A) with a stiffener that differs from a stiffener on a bottom head/gimbal assembly (FIG. 15B).
Figure 15B:
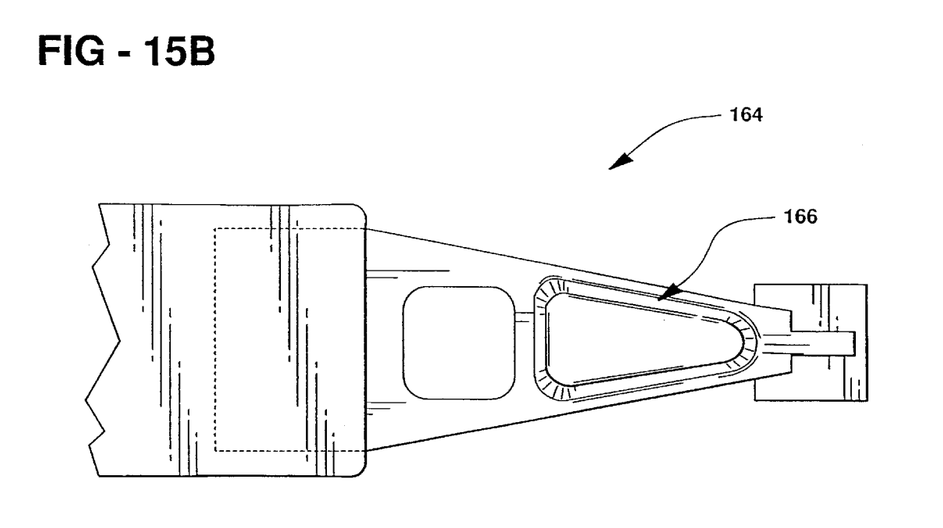

FIG. 15A shows top head/gimbal assembly 160 with formed bubble stiffener 162. FIG. 15B shows bottom head/gimbal assembly 164 with formed bubble stiffener 166. Stiffener 162 is of a different shape and/or formed height than stiffener 166. Other variations in the height/width and shape of the stiffeners are possible and are within the scope of the invention. FIG. 15 shows merely one embodiment.

Figure 16A:
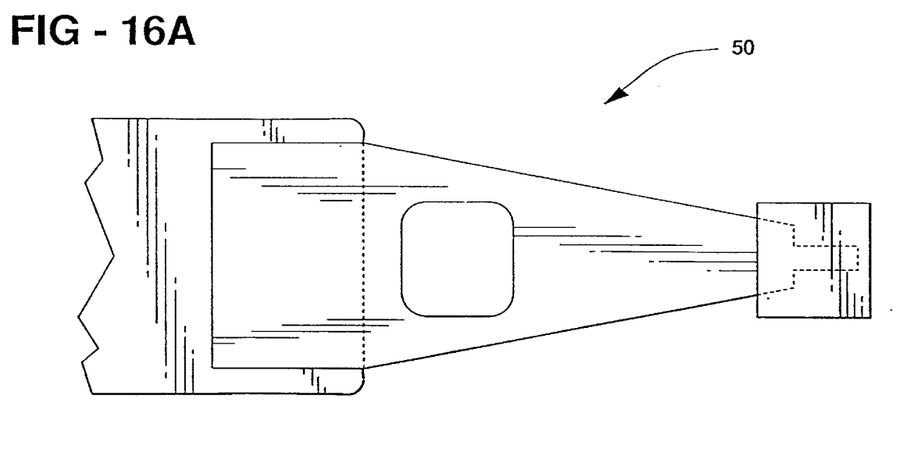
FIG. 16 is a top view of a bottom head/gimbal assembly (FIG. 16B) that has an opening that is not in a top head/gimbal assembly (FIG. 16A).
Figure 16B:
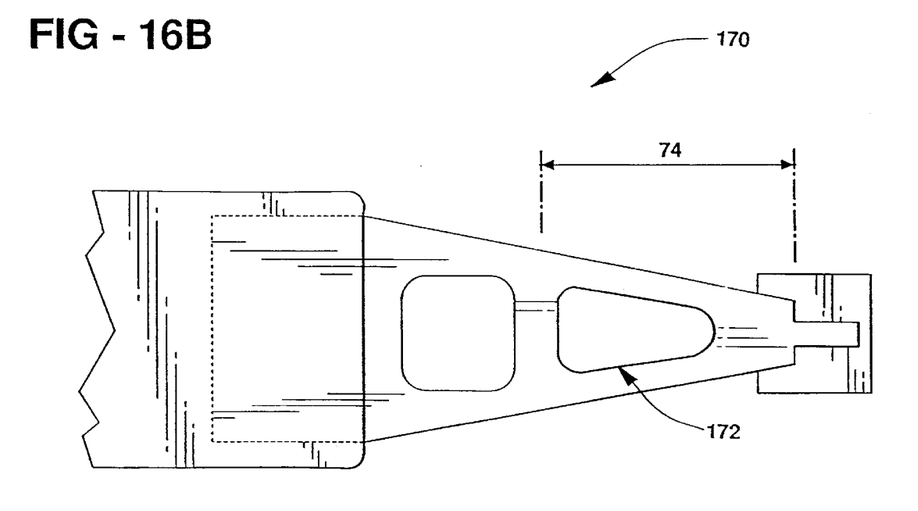

FIG. 16A shows top head/gimbal assembly 50. FIG. 16B shows a bottom head/gimbal assembly 170 that differs from top head/gimbal assembly 50 in that assembly 170 has an opening 172 in beam section 74 (shown in FIG. 5). Variations in the presence, number, size or location of openings in the load spring, beam or gimbal sections of the suspension are possible and are within the scope of the invention. FIG. 16 shows merely one embodiment.

Figure 17A:
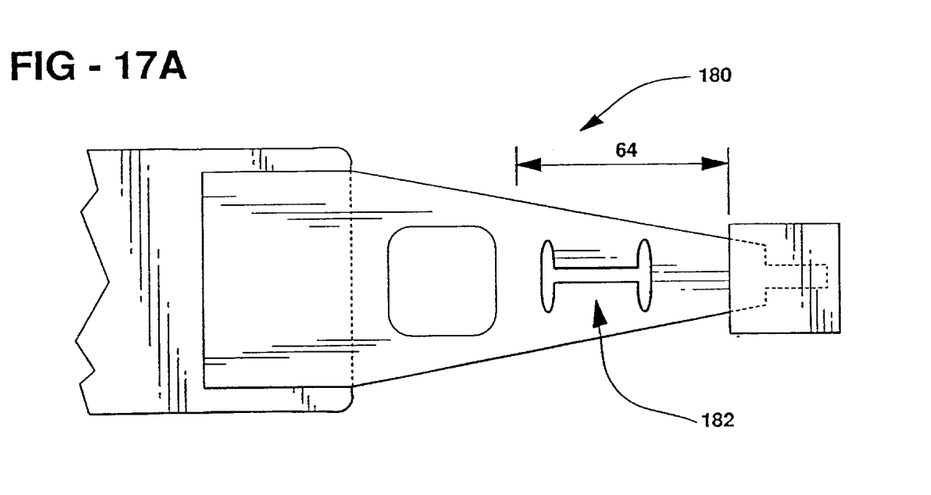
FIG. 17 is a top view of a top head/gimbal assembly (FIG. 17A) with a different formed feature from a bottom head/gimbal assembly (FIG. 17B).
Figure 17B:
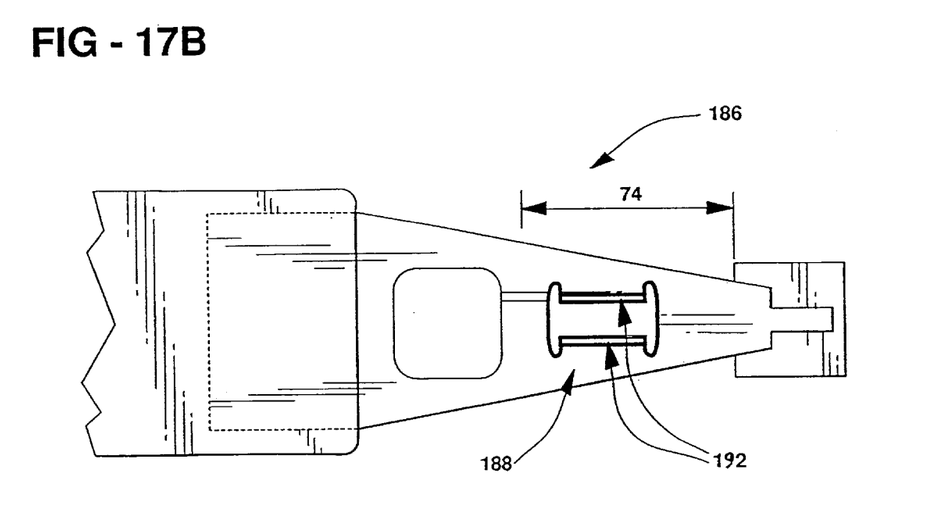

FIG. 17A shows top head/gimbal assembly 180. Top head/gimbal assembly 180 has a unformed (i.e. flat) etched pattern 182 in beam section 64. FIG. 17B shows bottom head/gimbal assembly 186 with formed (i.e. raised) feature 188 on beam section 74. Formed feature 188 has folded up flanges 192. Other differences in the shape and position of formed and unformed features are possible and are within the scope of the invention. The outline of the pattern may be formed by chemical etching or by mechanical stamping. FIG. 17 shows merely one embodiment.

Figure 18A:
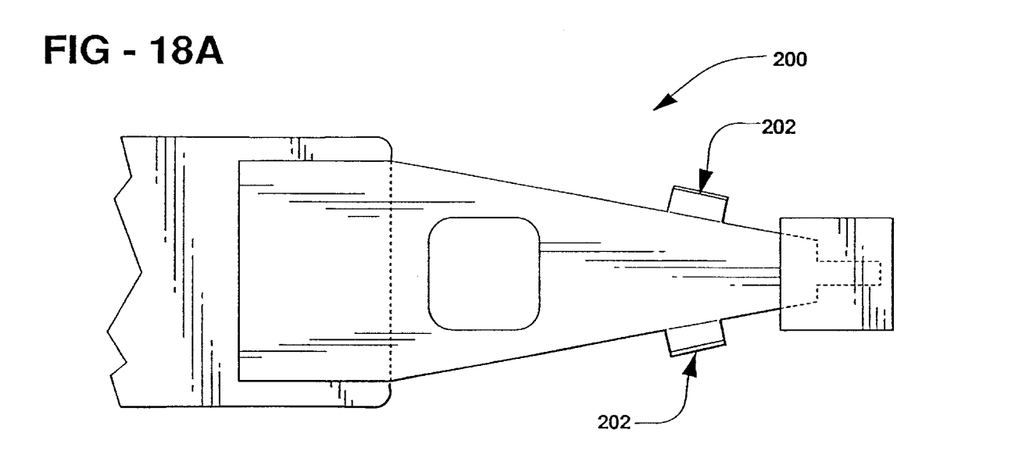
FIG. 18 is a top view of a top head/gimbal assembly (FIG. 18A) with an added mass appendage not present in a bottom head/gimbal assembly (FIG. 18B).
Figure 18B:
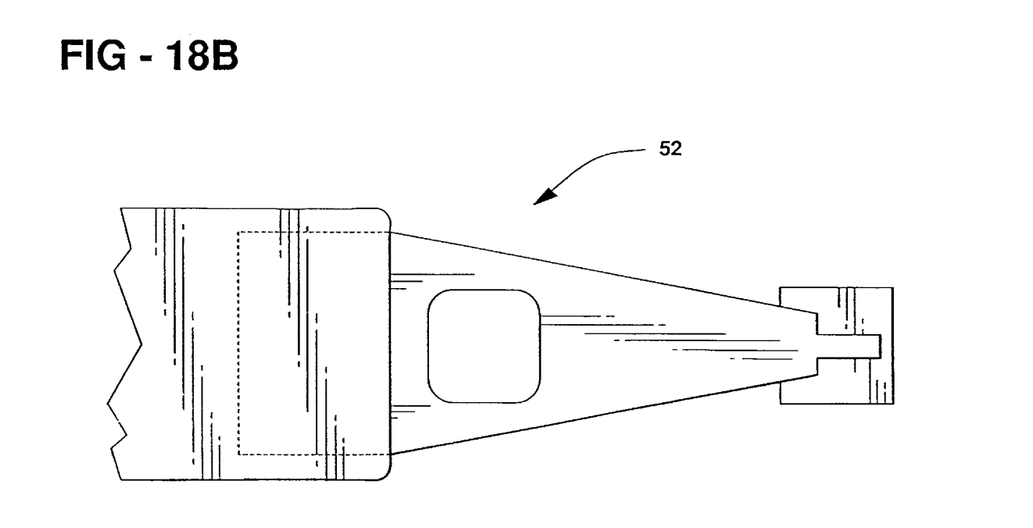

FIG. 18 shows that top head/gimbal assembly 200 (shown in FIG. 18A) and bottom head/gimbal assembly 52 are different in that assembly 200 has added mass in the form of an appendage 202 which is not present in bottom head/gimbal assembly 52. The appendages could be flat (unformed) or formed (raised) features. The outline of the pattern may be formed by chemical etching or by mechanical stamping. Other variations in the size, shape, placement and mass of the appendages are possible and are within the scope of the invention. FIG. 18 shows merely one embodiment. Another means of adding mass to one head/gimbal assembly is to use a different slider design, varying slider size and/or material.

Figure 19A:
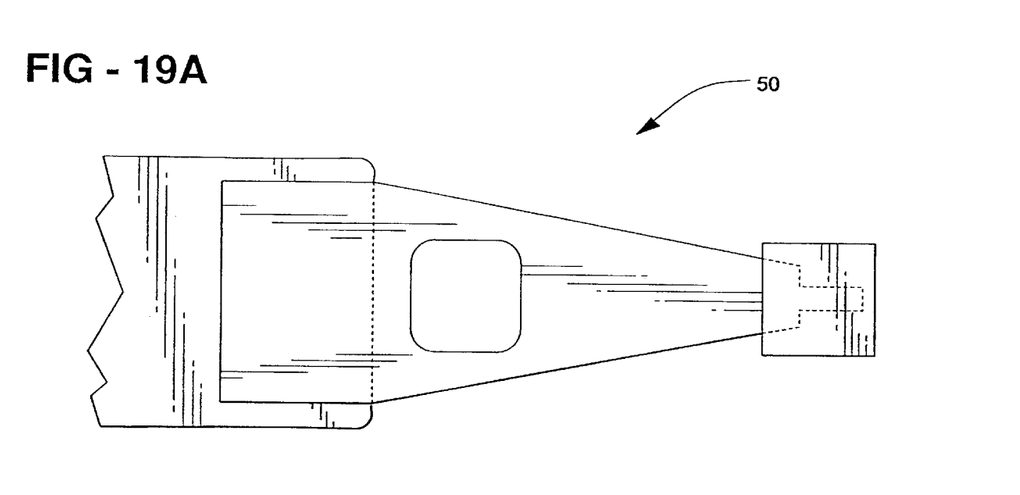
FIG. 19 is a top view of a bottom head/gimbal assembly (FIG. 19B) with adhesive areas not present on a top head/gimbal assembly (FIG. 19A).
Figure 19B:
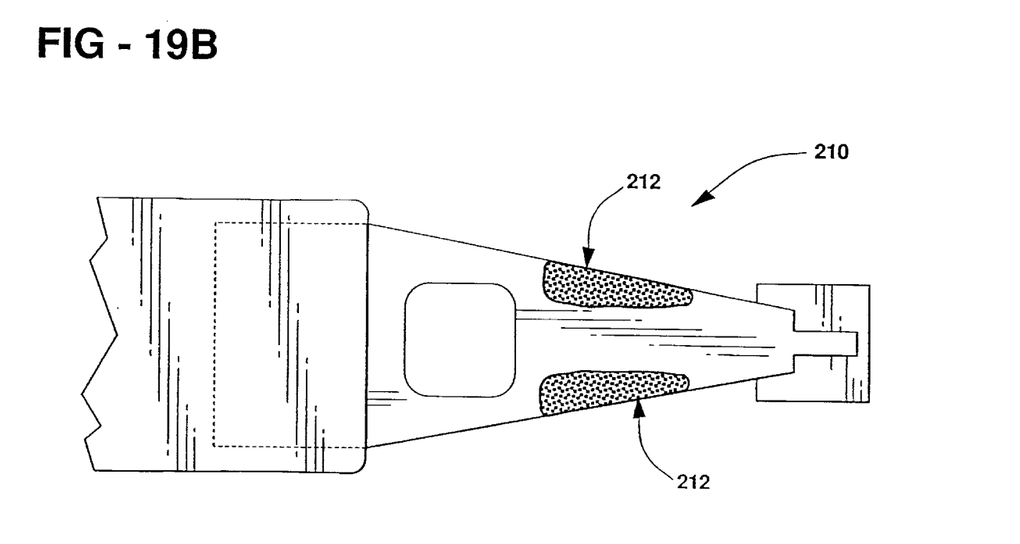

FIG. 19 shows that the top head/gimbal assembly 50 (shown in FIG. 19A) and bottom head/gimbal assembly 210 (shown in FIG. 19B) are different in that bottom assembly 210 has two areas of adhesive 212 that are not on top assembly 50. The presence, size, thickness, extent, number or location of adhesive areas can be varied and are within the scope of the invention. These adhesive areas are in addition to adhesives used to attach wires to the assemblies. The effects produced by adding the adhesive include additional mass and/or additional stiffness and/or additional damping.

The foregoing discussion addresses various particular alternative embodiments of the invention. Those skilled in the art will be able to formulate certain additional variations that, while different in some sense, do not depart from the spirit and scope of the invention. The invention is limited only by the following claims and their equivalents.

What is claimed is:

1. A head arm assembly comprising:

an arm;

a first head gimbal assembly comprising a first load beam attached to a first side of the arm and a first gimbal attached to the load beam, the gimbal for supporting a first slider having a first slider size; and a second head gimbal assembly comprising a second load beam attached to a second side of the arm and a second gimbal attached to the second load beam for supporting a second slider having a second slider size;

wherein the first slider size is different than the second slider size.

2. The head arm assembly of claim 1, further comprising:

means for connecting the head arm assembly to a disk drive.

3. A magnetic storage system comprising a disk with a data surface of concentric data tracks;

a spindle shaft supporting said disk, said spindle shaft for rotating said disk about an axis generally perpendicular to the disk;

at least one slider maintained in operative relationship with the data surface when the disk is rotating;

a transducer attached to the slider for reading data from and writing data to the data surface;

an electronics module for processing data read from and written to the data surface;

an actuator for moving the slider generally radially relative to the disk to allow the transducer to access the data tracks, the actuator further comprising one or more head/arm assemblies, each head arm assembly comprising:

an arm; a first head gimbal assembly comprising a first load beam attached to a first side of the arm and a first gimbal attached to the load beam, the gimbal for supporting a first slider having a first slider size; and a second head gimbal assembly comprising a second load beam attached to a second side of the arm and a second gimbal attached to the second load beam for supporting a second slider having a second slider size;

wherein the first slider size is different than the second slider size.

* * * * *